United States Patent
Benhase et al.

(10) Patent No.: US 8,918,607 B2
(45) Date of Patent: *Dec. 23, 2014

(54) DATA ARCHIVING USING DATA COMPRESSION OF A FLASH COPY

(75) Inventors: Michael Thomas Benhase, Tucson, AZ (US); Lokesh Mohan Gupta, Tucson, AZ (US); Yu-Cheng Hsu, Tucson, AZ (US); Alfred Emilio Sanchez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 12/950,992

(22) Filed: Nov. 19, 2010

(65) Prior Publication Data

US 2012/0131293 A1  May 24, 2012

(51) Int. Cl.
  *G06F 12/16* (2006.01)
  *G06F 3/06* (2006.01)
  *G06F 11/10* (2006.01)

(52) U.S. Cl.
  CPC ............ *G06F 3/065* (2013.01); *G06F 11/1076* (2013.01); *G06F 2211/1014* (2013.01)
  USPC ................... 711/162; 711/114; 711/E12.103; 709/247; 707/693

(58) Field of Classification Search
  CPC ... G06F 3/065; G06F 3/06638; G06F 3/0608; G06F 3/067; G06F 3/0689; G06F 2212/401; G06F 2211/1014; G06F 11/1076
  See application file for complete search history.

(56) References Cited

U.S. PATENT DOCUMENTS

| | | | |
|---|---|---|---|
| 5,623,701 A * | 4/1997 | Bakke et al. | 710/68 |
| 5,956,733 A * | 9/1999 | Nakano et al. | 1/1 |
| 6,282,643 B1 | 8/2001 | Cromer et al. | |
| 6,611,901 B1 * | 8/2003 | Micka et al. | 711/162 |
| 6,993,627 B2 | 1/2006 | Butterworth et al. | |
| 7,257,689 B1 * | 8/2007 | Baird | 711/162 |
| 7,330,997 B1 * | 2/2008 | Odom | 711/162 |
| 2003/0105928 A1 * | 6/2003 | Ash et al. | 711/136 |
| 2007/0266056 A1 * | 11/2007 | Stacey et al. | 707/203 |
| 2008/0307191 A1 * | 12/2008 | Lane et al. | 711/209 |
| 2009/0182961 A1 * | 7/2009 | Astigarraga et al. | 711/162 |
| 2009/0187613 A1 | 7/2009 | Spear et al. | |
| 2010/0174880 A1 | 7/2010 | McAllister et al. | |
| 2010/0185690 A1 * | 7/2010 | Evans et al. | 711/E12.001 |
| 2011/0196987 A1 * | 8/2011 | Benhase et al. | 709/247 |

* cited by examiner

*Primary Examiner* — Michael Krofcheck
(74) *Attorney, Agent, or Firm* — Griffiths & Seaton PLLC (57) ABSTRACT

Embodiments of the disclosure relate to archiving data in a storage system. An exemplary embodiment comprises making a flash copy of data in a source volume, compressing data in the flash copy wherein each track of data is compressed into a set of data pages, and storing the compressed data pages in a target volume. Data extents for the target volume may be allocated from a pool of compressed data extents. After each stride worth of data is compressed and stored in the target volume, data may be destaged to avoid destage penalties. Data from the target volume may be decompressed from a flash copy of the target volume in a reverse process to restore each data track, when the archived data is needed. Data may be compressed and uncompressed using a Lempel-Ziv-Welch process.

8 Claims, 11 Drawing Sheets

DATA ARCHIVING USING DATA COMPRESSION OF A FLASH COPY

BACKGROUND

The disclosure relates generally to data storage systems, and more particularly to archiving and restoring data in a storage system.

Users of data storage disk systems often offload or archive less frequently used data to tape storage systems as tape systems provide far larger capacity and lower cost per data unit. When the users need to access the archived data again, a tape archive library system mounts the tape cartridges containing the archived data into the system and restores the archived data from the tape cartridges. Such a tape archiving process may lead to a delay in accessing the desired data as the data is not readily available in disk storage when it is needed.

As the cost of disk storage per data unit continues to decrease, disk storage is becoming an attractive medium for data archiving. Current data archiving solutions using disks often have a substantial amount of metadata associated with data compression and uncompression, which impacts system performance. In addition, metadata adds complexity to the implementation of storage management functions in the system.

"Remote copy" is another technology that may be used for archiving by replicating data at a remote storage facility. Remote copying transfers data from the main or local storage facility to the remote storage facility each time data is written or updated to a storage device of the local facility. However, remote copy, as well as implementations of backup and restore technologies introduce additional problems in the areas of security and management of data recovery.

BRIEF SUMMARY OF THE DISCLOSURE

The disclosure relates to archiving and retrieving data in a storage system based on flash copying and data compression. One aspect of the disclosure concerns a system for archiving data that may comprise a first (source) volume, a logic component for making a flash copy of data in the first volume while the first volume is off-line, and a logic component for compressing each track of data in the flash copy into a set of pages of compressed data. The system may store the pages of compressed data in a second (target) volume in the storage system. The flash copying may be a background operation.

In one embodiment, the system may allocate data extents for the second volume, as needed, from a pool of compressed data extents and update a volume structure to indicate the extents allocated to the second volume. The system may further decompress data using a flash copy of the second volume when a user or an application later needs to access the archived data.

An another aspect of the disclosure concerns a computer implemented method for archiving and retrieving data using flash copying. The method may comprise making a flash copy of data in a first (source) volume of a storage system while the source volume is off-line, and compressing data in the flash copy wherein each track of data is compressed into a set of pages of compressed data. The method may store the pages of compressed data in a second (target) volume in the storage system. The flash copy may be made in a background process.

In one embodiment, the method may allocate data extents for the second volume, as needed, from a pool of compressed data extents and update a volume structure to indicate the extents allocated to the second volume. The method may further restore the archived data by decompressing data from the second volume using a flash copy of the volume, when a user or application needs to access the archived data.

Still another aspect of the disclosure concerns a computer program product for archiving and retrieving data using flash copying. The computer program product comprises a computer readable storage medium having computer readable program code embodied on the storage medium. The program code may be configured to make a flash copy of data in a first (source) volume of a storage system while the source volume is off-line, and compress data in the flash copy wherein each track of data is compressed into a set of pages of compressed data. The program code may further store the pages of compressed data in a second (target) volume in the storage system and make the flash copy in the background.

In one embodiment, the program product may comprise program code configured to allocate data extents for the second volume, as needed, from a pool of compressed data extents and update a volume structure to indicate the extents allocated to the second volume. Further, the program code may be configured to restore the archived data by decompressing data from the second volume using a flash copy of the volume, when a user or application needs to access the archived data.

The details of the preferred embodiments of the disclosure, both as to its structure and operation, are described below in the Detailed Description section in reference to the accompanying drawings. The Brief Summary is intended to identify key features of the claimed subject matter, but it is not intended to be used to limit the scope of the claimed subject matter.

DETAILED DESCRIPTION OF THE DISCLOSURE

Embodiments of the disclosure relate to archiving data in a storage system by compressing a flash copy of the data to be archived and storing the compressed data in a target data volume. The embodiments further relate to restoring the archived data by decompressing a flash copy of the compressed data in a reverse process.

Data Storage System

Figure 1:
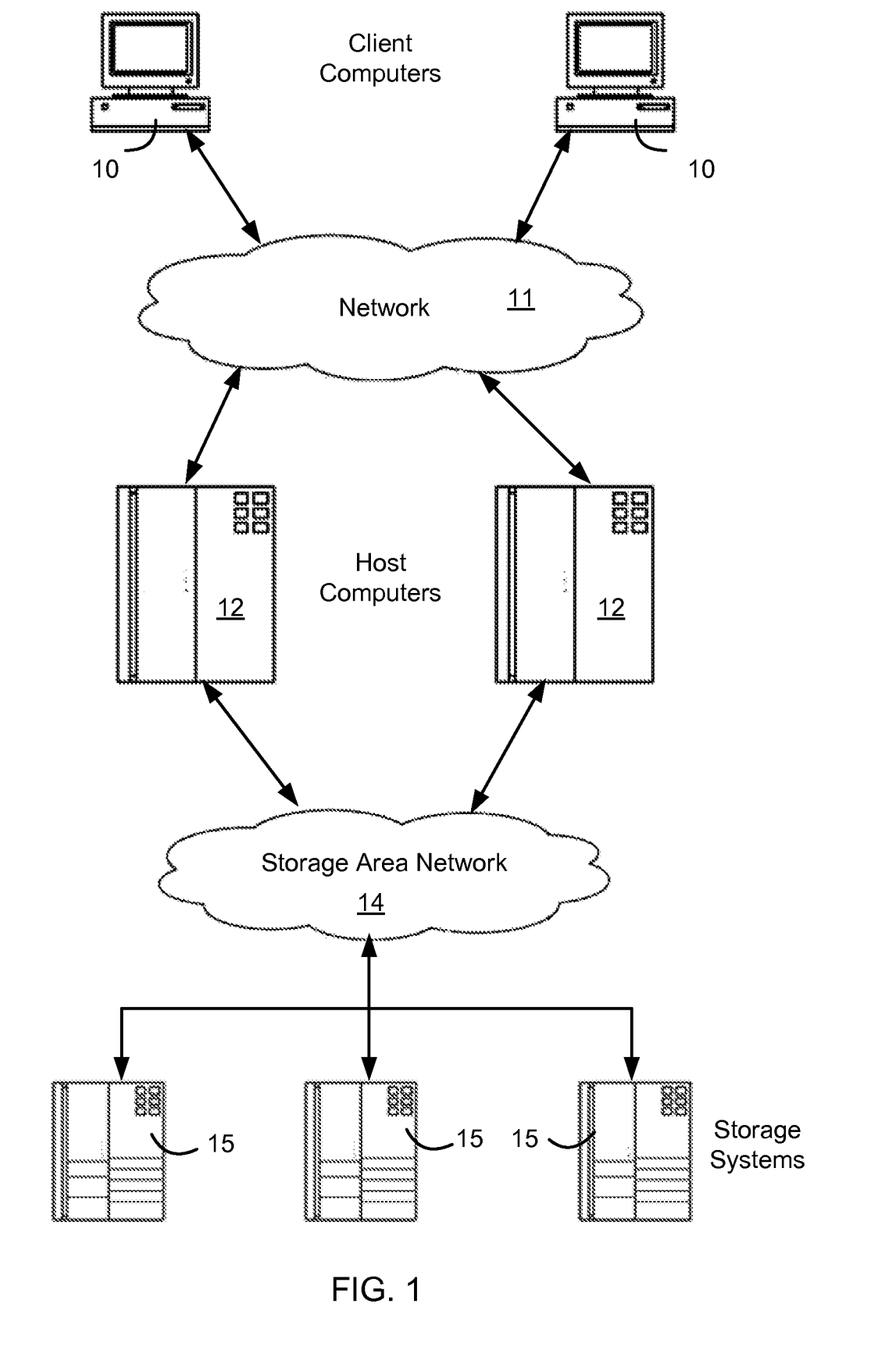
FIG. 1 illustrates an exemplary configuration of host computers, networks and storage systems in which aspects of the disclosure may be provided.

Referring now to the drawings and in particular to FIG. 1, there is illustrated an example of a computing environment in which aspects of the disclosure may be implemented. The computing environment in FIG. 1 is presented only by way of example and is not intended to be limiting. The data archiving system and method disclosed herein may be applicable to a wide variety of different computers, servers, storage systems, and network architectures, in addition to the configuration in FIG. 1. The illustrated configuration may comprise multiple client computers 10 that access one or more host computers 12 through a computer network 11. The computer network 11 may be a wide area network (WAN), a local area network (LAN), a private intranet, or the Internet. The host computers 12 include CPUs (Central Processing Units) and memory for executing various programs, thereby providing a variety of computing functions to the client computers 10. The hosts 12 may include servers that host applications for providing computing services such as web services and database applications.

The host computers 12 may be further connected to one or more storage systems 15 through a network 14 such as a storage area network (SAN), a LAN (Local Area Network), a Fibre Channel interface or other host interface protocols. A SAN is a dedicated high performance network between servers and storage resources, such as Fibre Channel (FC), Enterprise Systems Connection (ESCON), Small Computer Systems Interface (SCSI), Internet SCSI (iSCSI), Serial Storage Architecture (SSA), High Performance Parallel Interface (HIPPI), or other protocols with similar functions. The data storage systems 15 may comprise hard disk drives, solid state drives, arrays of hard disk drives or solid-state drives, tape drives, tape libraries, CD-ROM libraries, or the like. Further, the data storage systems 15 may comprise multiple levels such as a primary level of solid state storage, a secondary level of disk storage, and a third level of tape libraries.

Users and computer programs may store data on storage systems 15 and retrieve data from them, using various data processing applications and storage management software running in the hosts 12 and the storage systems 15. The storage management software may provide, among other functions, utilities for managing data in the storage systems 15 such as the allocation of data volumes, data backup, restore, copy, recovery, migration, and data archiving.

Figure 2:
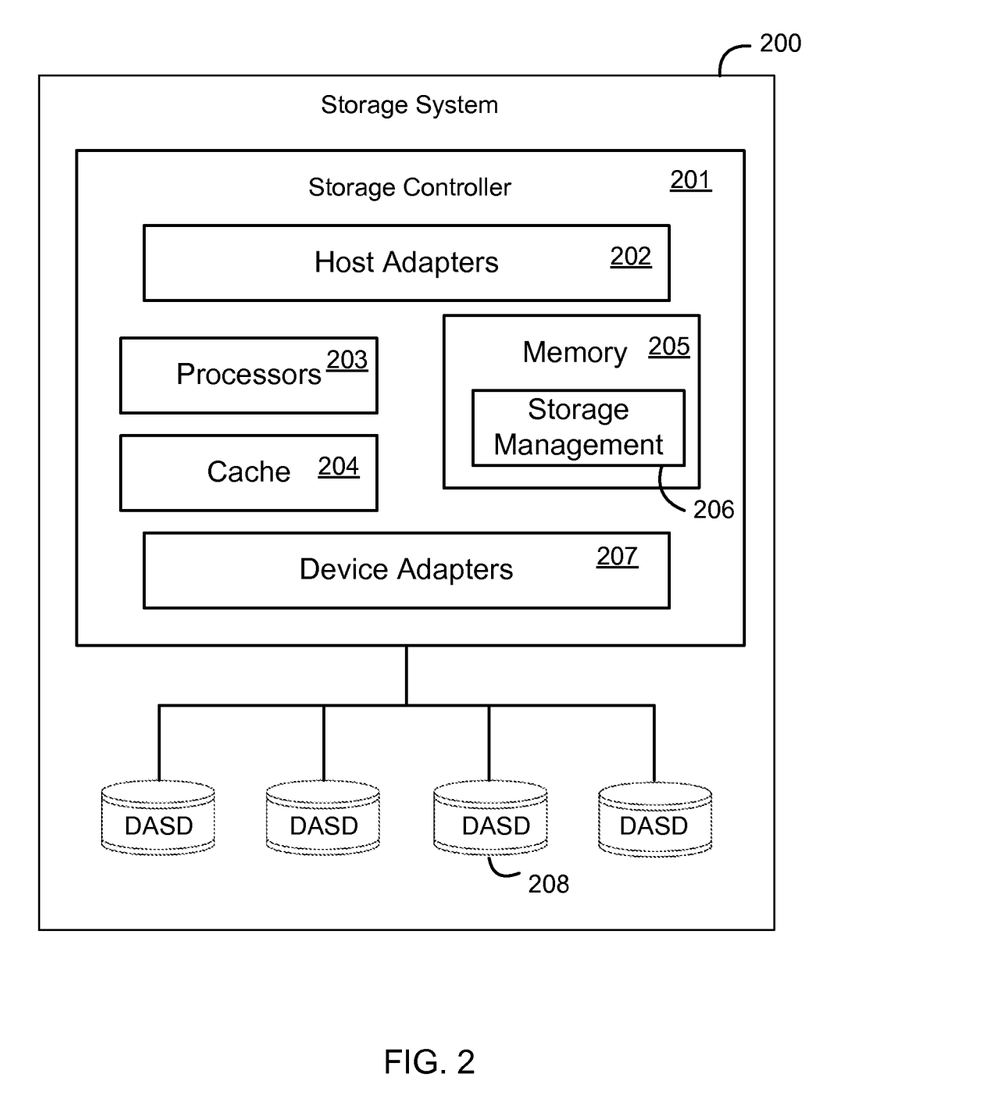
FIG. 2 illustrates a block diagram of the components of a representative data storage system that may be used for providing aspects of the disclosure.

FIG. 2 illustrates an exemplary disk storage system 200 that comprises a storage controller 201 configured to handle data read and write requests from the host computers 12 with respect to disks (DASDs) 208. One example of a storage system 200 is the IBM DS8000™ enterprise storage system. The DS8000™ is a high-performance, high-capacity storage controller providing disk storage that is designed to support continuous operations. The storage controller 201 may include host adapters 202 for interfacing with host computers 12 and device adapters 207 for interfacing with attached storage devices such as disks 208. The host adapters 202 may support various host-device interface protocols such as Fibre Channel (FC), Fibre Channel Arbitration Loop (FC-AL), Internet Small Computer System Interface (iSCSI), etc.

The storage controller 201 may employ one or more processors 203 for controlling the operation of the controller 201 and for manipulating data in the controller, one or more cache memory 204 for temporarily storing data, and one or more memory 205 for holding programs and data. Such computer programs may include storage management software 206 for managing data in the storage system 200, and for interacting with the host computers 12 and data storage devices 208. Device interface software of storage management software 206 may manage read and write requests to logical data volumes in the storage disks 208. The storage controller 201 may use internal memory 205 for virtual disk volumes that are mapped to local data stored on physical storage disks 208 as part of a storage virtualization implementation.

Figure 3:
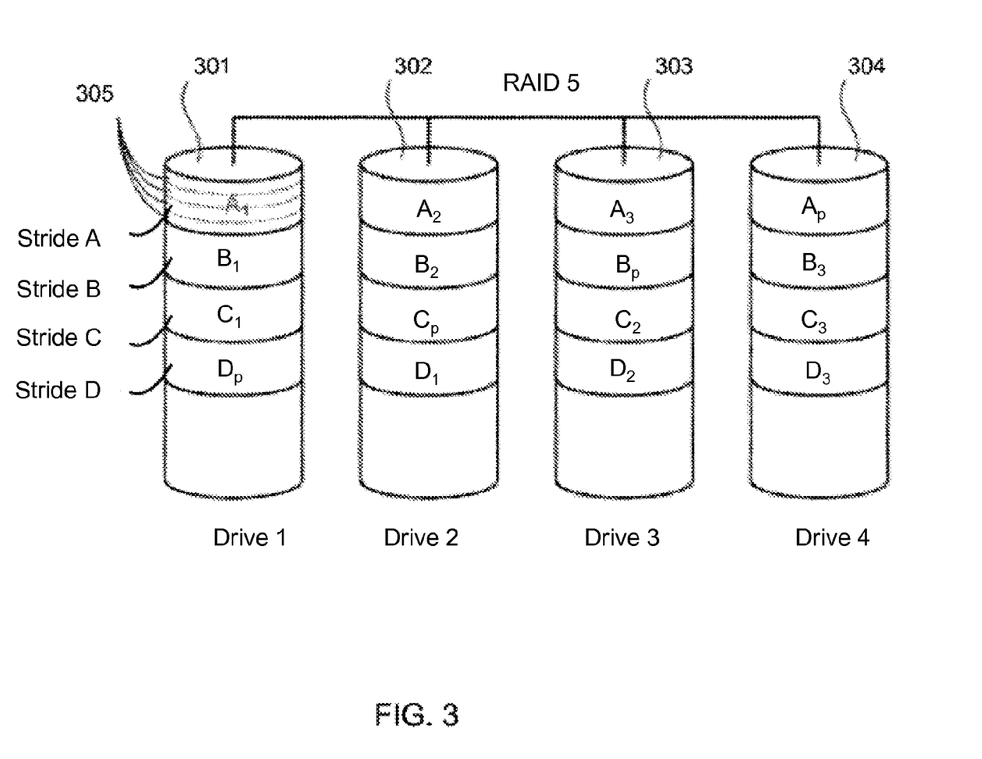
FIG. 3 illustrates an example of a RAID storage configuration that may be used for providing aspects of the disclosure.

For improved data integrity, disk storage systems may be configured as RAID systems (redundant arrays of inexpensive disks). FIG. 3 illustrates an example RAID-5 configuration with four disk drives 301-304. A RAID-5 system segments sequential data and stores the data across multiple disk drives 301-304. With a four-disk configuration, the RAID system stores data segments "$A_1$", "$A_2$," and "$A_3$" on three separate disks 301-303. Each segment includes one or more tracks 305, although other divisions are also possible. Parity data "$A_p$" may be calculated by performing an XOR operation on segments $A_1$, $A_2$, and $A_3$. This parity data may be stored on disk 304. The segments "$A_1$", "$A_2$," and "$A_3$" are referred to as "stride A", where a stride is set of tracks for which a RAID array computes parity. In the event one of the disks 301-303 fails, the remaining data and parity values may be used to reconstruct the data on the failed disk. For example, if the disk 302 containing $A_2$ is lost, the values $A_1$, $A_3$, and $A_p$ may be used to reconstruct $A_2$.

Disks configured in a RAID system may offer accelerated read performance since data may be accessed from multiple drives 301-303 at the same time. However, there is generally increased overhead when performing writes to the array. This is primarily due to the parity calculation. For example, in order to write to $A_1$, the values $A_2$, $A_3$, and $A_p$ need to be loaded (staged) from the disks 301-304, the value $A_1$ needs to be modified on the disks, and the parity value $A_p$ needs to be recomputed and destaged to the disks 301-304. The writing process requires four disk operations. On the other hand, a full stride of data (i.e., $A_1$, $A_2$, and $A_3$) may be destaged to the disks 301-304 along with the parity value $A_p$ using a single disk operation. This is because there is no need to load the data values or parity value from the disks 301-304 when writing a stride to the system.

Data Management

Data may be stored on secondary storage devices, such as a direct access storage device (DASD) or a magnetic tape device, and typically managed as data volumes. Although DASD volumes may differ in physical appearance, capacity, and speed, they are similar in data recording, data checking, data format, and programming regardless of how the data is actually written to the storage subsystem media. Data for a logical DASD volume is written as blocks. Each block of data on a DASD volume has a distinct location and a unique address, making it possible to find any block without extensive searching. Blocks may be stored and retrieved either directly or sequentially.

Data management is the part of the operating system or storage management programs that organizes, identifies, stores, catalogs, and retrieves all the information (including programs) in a computer system. Data management may handle the following tasks:

Sets aside (allocates) space on DASD volumes.
Automatically retrieves cataloged data sets by name.
Mounts magnetic tape volumes in tape drives.
Establishes a logical connection between an application program and the storage medium.
Controls access to data.
Transfers data between the application program and the storage medium.
Archiving data and restoring archived data.

Information is recorded on all DASD volumes in a standard format. This format may be as fixed-block data, count-key data (CKD), or extended count-key data (ECKD). Each track contains a record 0 (also called track descriptor record or capacity record) and data records. Units of data written on DASD volumes are referred to as records or blocks. Data blocks are further grouped into tracks. Groups of data tracks are referred to as extents. The process of grouping records into blocks is called blocking. The extraction of records from blocks is called unblocking. Blocking or unblocking might be done by the application program or the operating system.

Figure 5:
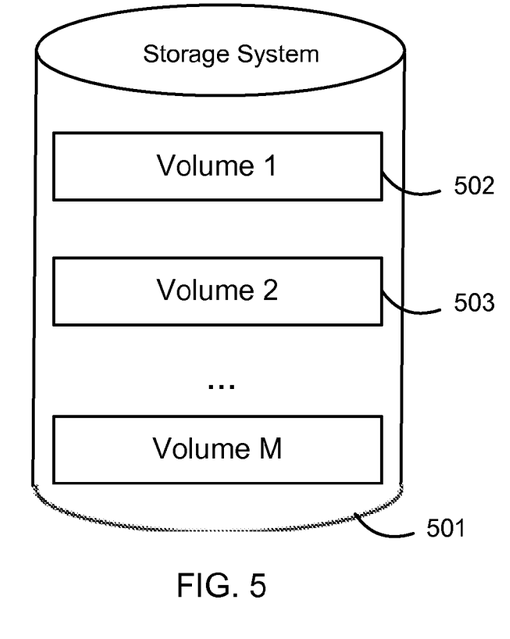
FIG. 5 illustrates an example of data storage volumes in a storage system.

Users and applications generally access storage areas in a storage system as logical volumes. The host computers 12 use the identifiers of the logical volumes to read data from or write data to the storage system. The identifiers of the logical volumes are referred to as Logical Unit Number ("LUN"). A logical volume may be in a single physical storage device or a plurality of storage devices. A single physical storage unit such as a disk or disk array may have multiple logical volumes, as shown in FIG. 5. In a disk array, a logical volume provides a logical interface to the data stored in the disk array, regardless of where the data is physically stored within the array. For example, it is common to allocate a storage track of a data volume across multiple disks in a disk array, using a technique called "striping." As a result, an application in a host system accesses such a volume as a continuous disk volume, although the data is physically distributed throughout the disk array.

Figure 4:
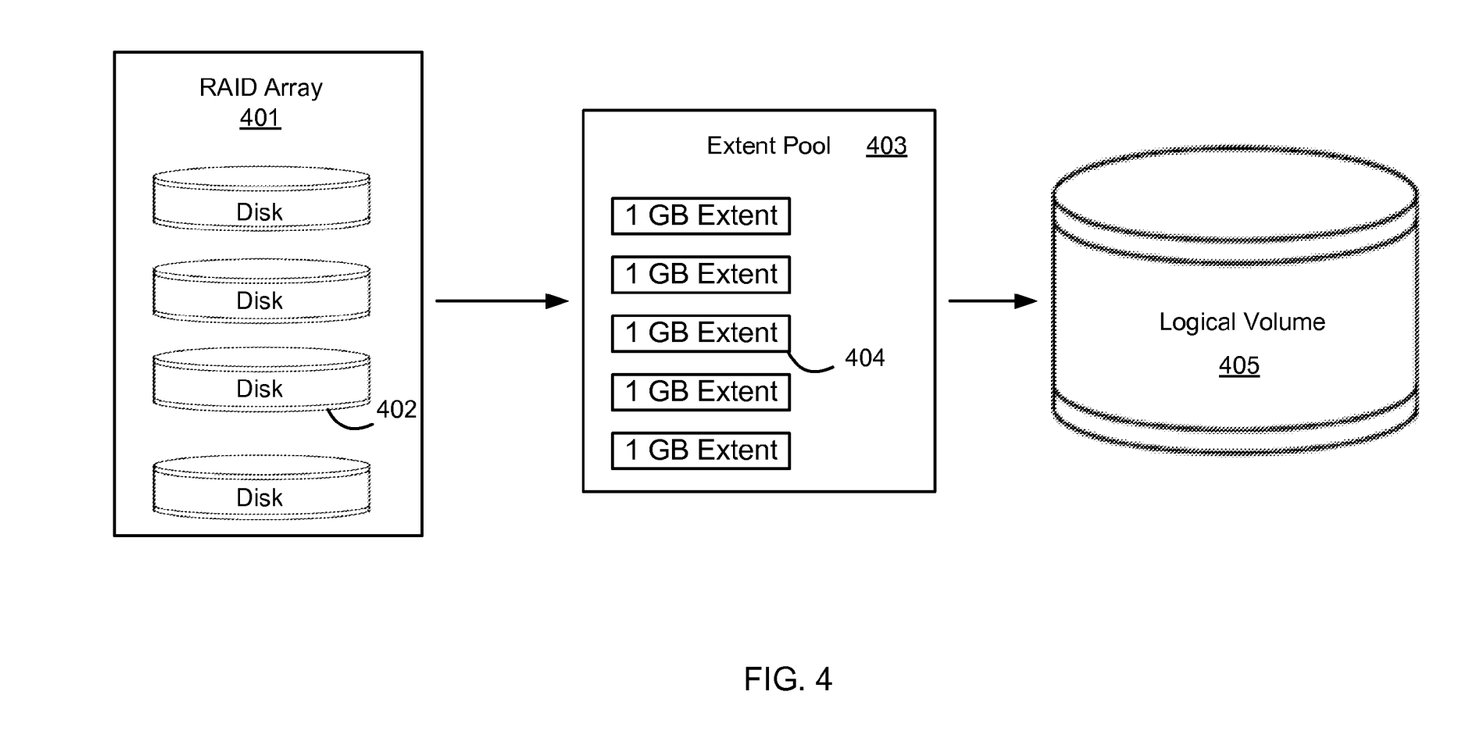
FIG. 4 shows an example of a logical data volume that is allocated from data extents provided by a disk array (RAID) storage system, according to an embodiment of the disclosure.

A storage management software may allocate data volume from units of data storage referred to as extents. For example, in current IBM TotalStorage™ systems DS8000™, the data extents are 1 gigabytes (1 GB) in size. FIG. 4 illustrates an example logical volume 405 that is allocated from data extents 404 of a RAID system 401. As described with reference to FIG. 3, the RAID system 401 may be configured with a group of disks 402. A storage management software may maintain available (unallocated) extents 404 in an extent pool 403 from which a group of extents 403 may be allocated for a logical volume 405. This allocation may occur when a user or application issues a command to allocate the volume 405 with a volume identifier and a volume size. For example, the user may allocate a logical volume 405 of 30 GBytes of data, which would require 30 extents 404, each of 1 GBytes of storage space, to be allocated to the volume. In a storage virtualization environment, this storage area of 30 GBytes may be in virtual storage, i.e., in the storage system memory, and does not necessarily occupy 30 GBytes of real storage in the RAID system 401.

Data Archiving

Data archiving refers to an operation that moves data from one storage tier to another storage tier in a data storage hierarchy. The storage tier holding the archived data is typically at a lower hierarchical level that has a slower response time, lower cost per data unit, and larger capacity than the tier from which data is archived. For example, in a data center, a data archival may move infrequently used data from disk storage systems to tape libraries. Data is generally archived in units of volumes and the archival may be to a storage subsystem at a remote location or within the same data center. FIG. 5 illustrates an example of data storage volumes 502-503 in a storage system 501 that may be archived and retrieved using the embodiments of the disclosure.

Figure 6:
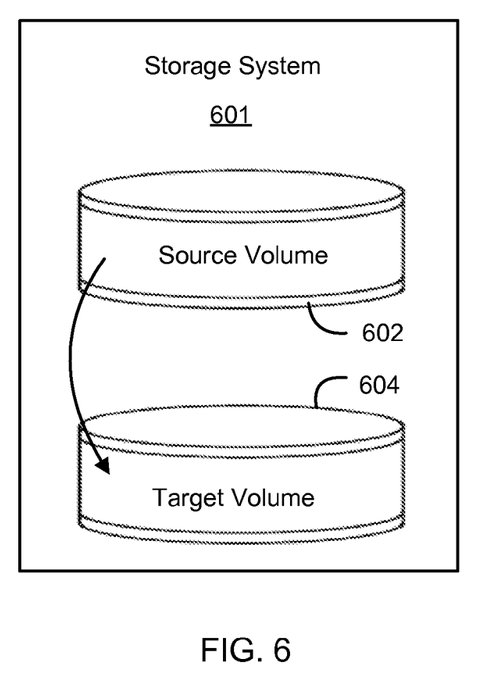
FIG. 6 illustrates data from a source volume being archived to a target volume according to an exemplary embodiment of the disclosure.

FIG. 6 illustrates a high-level view of a data archiving operation according to an embodiment of the disclosure. The original data volume holding the data to be archived is referred to as the source volume and the volume holding the archived data is referred to as the target volume. The archived target volume 604 is typically in the same storage system 601 as the source volume 602, as shown in FIG. 6, but may be in another storage system. In the illustrated embodiment, the target volume 604 may be at the same storage level as the source volume 602, e.g., at the disk storage level, to take advantage of the performance benefits offered by disk storage devices. The archived data is in a compressed format, and as a result occupies significantly less storage space than the original uncompressed data.

Figure 7:
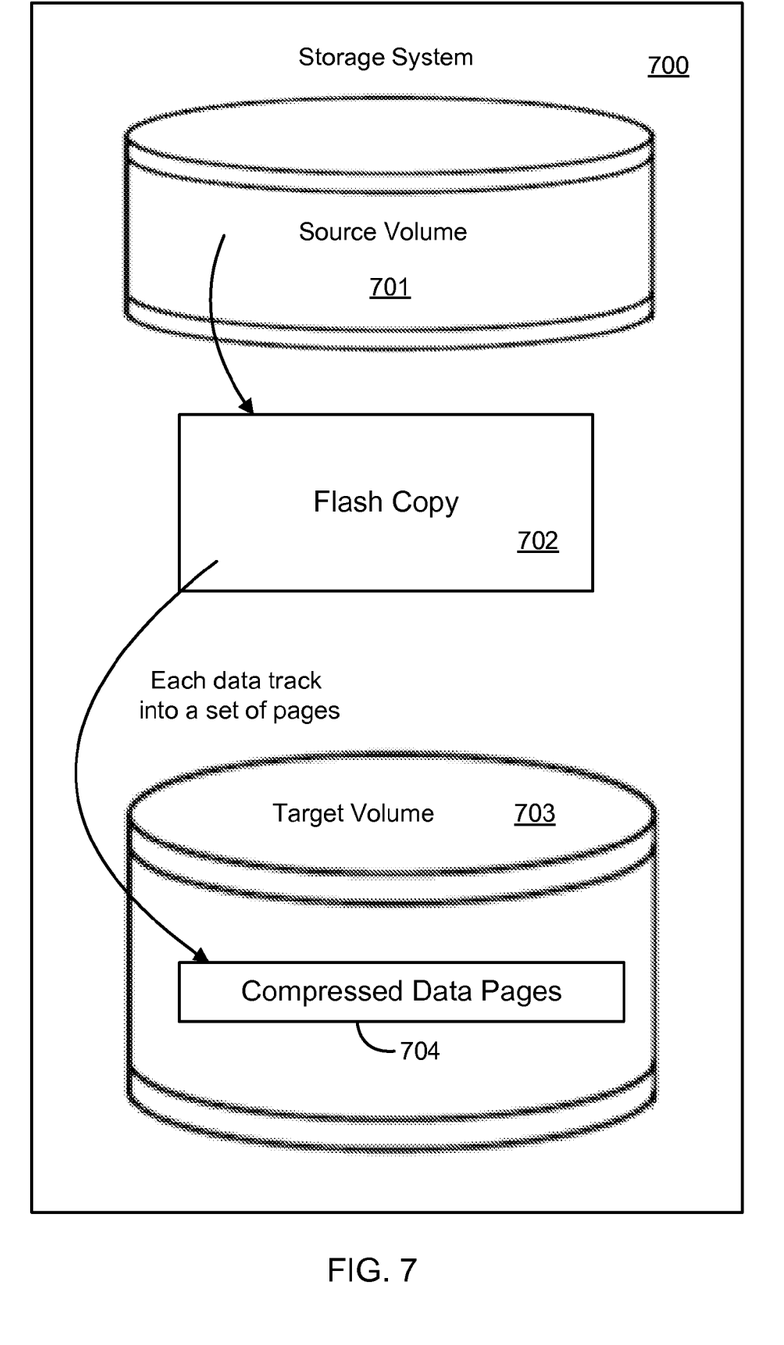
FIG. 7 illustrates further details on the archiving of source volume data to a target volume according to an exemplary embodiment of the disclosure.

FIG. 7 illustrates further details of a data archiving operation according to an exemplary embodiment of the disclosure. In the illustrated example, the source volume 701 and the target volume 703 are shown as being on the same storage system 700, but may be on different storage systems. The storage system 700 may start a data archival by making a flash copy 702 of data in the source volume 701. A flash copy or snapshot copy of a volume is a "point-in-time" copy of the data stored in the volume, typically in the form of logical directories. The logical directories associate data to physical locations, i.e., data tracks, of the volume.

The flash copy 702 provides an image of the source volume 701, particularly the arrangement of the data in the source volume 701, at the particular instance of time when the flash copy 702 was performed. The flash copy 702 may be used to reconstruct the state of the volume at the time the copy was performed or to compare it to current data in the volume. Although the flash copy 702 is shown in the figures and described as a separate entity from the source volume 701 for clarity, it is an image of the source volume 701 in the storage system 700 and generally does not occupy another storage area, separately from the source volume 701, in the storage system 700.

During the flash copying operation, updates to the source volume 701 are suspended (generally for a very short time) so as to provide a consistent view of the source volume data and the flash copy data at a common point in time. A flash copy utility may copy the pointers for the tracks containing the source data from a track table of the source volume 701 to a track table of the flash copy 702, without actually moving any of the source data on the storage devices referenced by the pointers. Upon completion of the flash copying, updates to data in the source volume 701 may resume. In one embodiment of the disclosure, the flash copy 702 of the source volume 701 may be made as a background operation, which generates a physical copy of the source volume.

Figure 8:
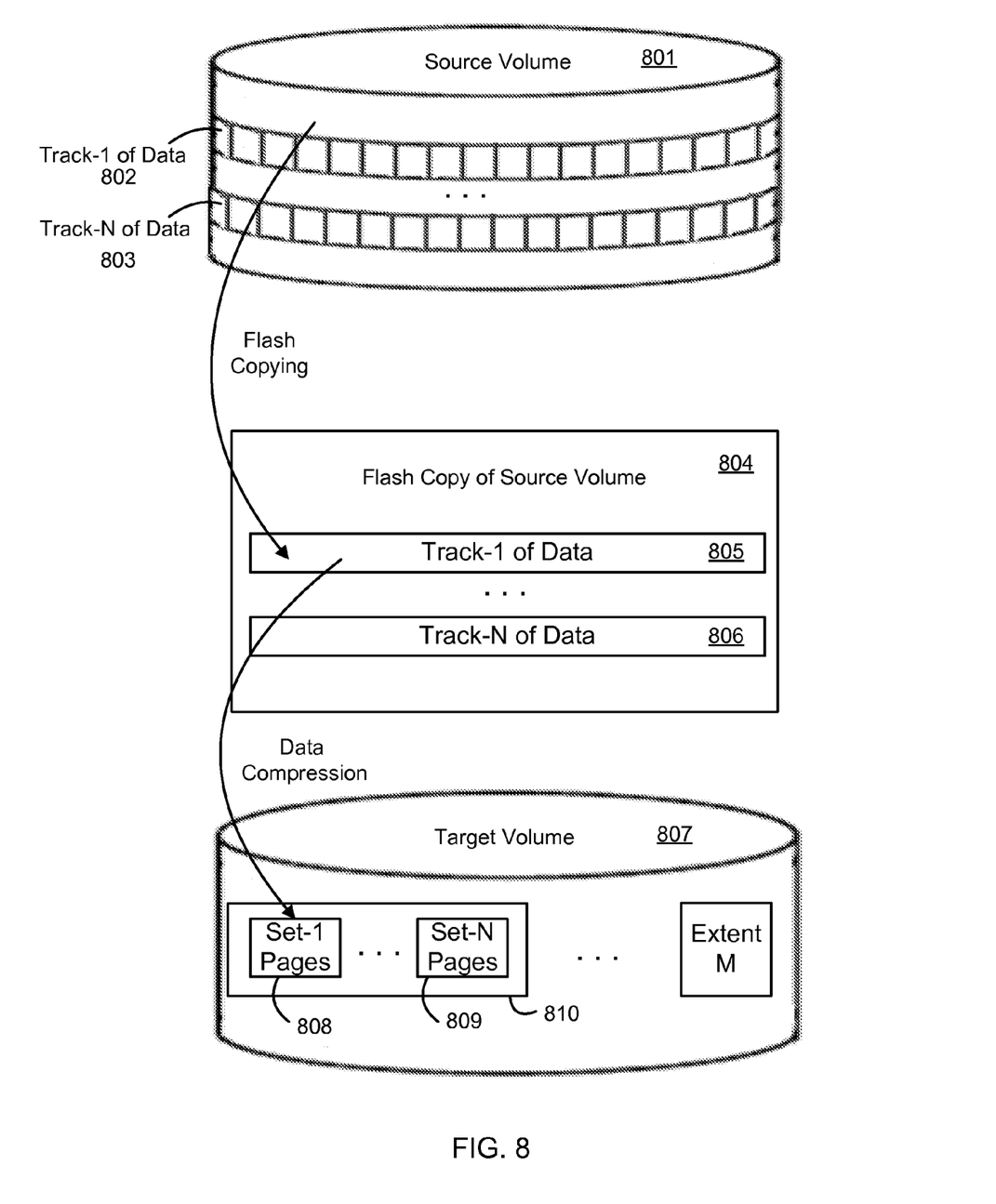
FIG. 8 illustrates the relationship between data tracks of a source volume, a flash copy of the source volume data, and pages of compressed data stored in a target volume, according to an exemplary embodiment of the disclosure.

Once the flash copying is completed, the storage system 700 may compress each track of data in the flash copy 702 into a set of pages of compressed data 703 using a data compression technique, such as Lempel-Ziv-Welch (LZW) data compression. For example, the storage system 700 may compress a data track of 64 Kbytes into 2 data pages of size 4 Kbytes each. The set of compressed data pages 704 resulting from each track of data from the flash copy 702 is stored in the target volume 703. FIG. 8 illustrates further details on an example of the data compression. In an embodiment of the disclosure, the storage system 700 may initially create the target volume as a thinly provisioned compressed data volume with no data extents allocated to it. The storage system 700 may further take the source volume off-line to suspend normal data read and write activities to the source volume during the archiving of the source volume data.

The storage system 700 may perform the data compression by start reading data tracks in the target volume 703, from the beginning of the volume to the end of the volume. If the data track being read has not been copied into the target volume 703, then the read operation is directed to the source volume 701 for the data. The storage system 700 may employ a compression engine, such as a LZW compression engine, to compress the read data track into a set of data pages. The storage system 700 then stores the pages of compressed data from the compression engine in the target volume 703.

In one embodiment of the disclosure, the compression of the flash copy 702 data continues until all tracks in a stride worth of data in the flash copy 702 have been compressed, before data of the compressed tracks is destaged from the storage system's memory. The destage of a full stride, rather than after the compression of each data track, minimizes impact to the performance of the storage system 700.

With the destage of a full stride, a RAID system can compute a new parity from the full stride. Otherwise, the RAID system would need both the old data and old parity to compute the new parity. A full stride destage thus requires fewer drives operations than a partial stride destage. Extra drive operations required for partial strides are referred to as destage penalties. Once the storage system 700 has compressed all data in the source volume 701 and stored the compressed data in the target volume 704, the storage system 700 may deallocate the uncompressed data extents for the source volume 701. FIG. 8 illustrates the relationship between source volume data tracks, compressed data from the flash copy, and the resulting pages of compressed data.

When a user or an application later needs to access the archived data, the storage system 700 may retrieve the compressed data pages 704 from the target volume 703 and uncompress them into the original tracks, in a reverse process. The system 700 may uncompress each set of compressed data pages 704 corresponding to an original data track into the original track, using the same compression technique that the system previously used to compress the data, e.g., LZW data compression. Similar to the compression process, the storage system 700 may uncompress all data tracks in a stride before destaging the stride's data from the storage system's memory. This full stride destaging minimizes impact to the performance of the storage system 700. The storage system 700 then stores the uncompressed data tracks in the source volume 701. Further details on data compression and data uncompression are described below with reference to the flow charts in FIG. 9 through FIG. 11.

FIG. 8 illustrates the relationship between data tracks from a source volume to be archived, data in a flash copy, and pages of compressed data in a target archive volume, according to an exemplary embodiment of the disclosure. As an example, FIG. 8 shows N tracks of data 802-803 from a source volume 801 being copied to the flash copy 804 as data tracks 805 and 806, respectively. The storage system 700 compresses each track of data from the flash copy 804 into a set of data pages to be stored in the target volume 807. For example, the track-1 data 805 from the flash copy 804 may be compressed into set-1 pages 808 of data in the target volume 807, and so on until track-N data 806 is compressed into set-N data pages 809 in the target volume 807. FIG. 8 further illustrates that the data pages of set-1 through set-N fit into a compressed data extent 810. If additional compressed storage space is needed, for example, up to M data extents to hold all the data pages compressed from the source volume 801, then the storage system 700 would allocate the additional extents from the pool of compressed extents as previously described in reference to FIG. 4.

Figure 9:
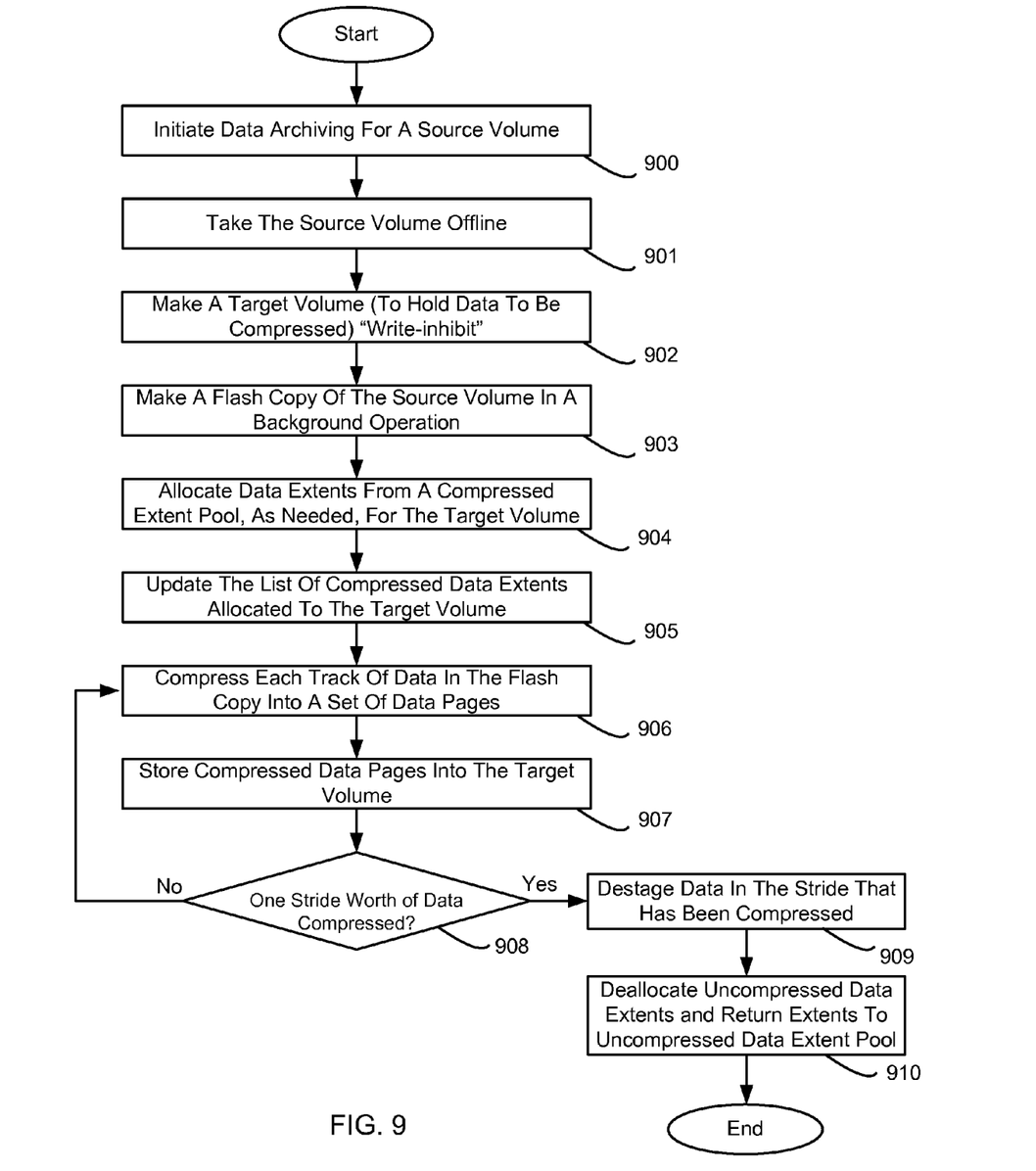
FIG. 9 is a flow chart of an exemplary process for archiving data in a storage system, according to an embodiment of the disclosure.

FIG. 9 illustrates a flow chart of a process for archiving data in a source data volume according to an exemplary embodiment of the disclosure. The process may start at step 900 when the storage system 700 receives an archive command from a user or a storage management program. In the illustrated embodiment, the storage system 700 may suspend activities to the source volume 701 by taking it off-line, at step 901, and mark the target volume 703 as "write-inhibit" at step 902 to suspend data updates to the target volume during the archiving process. At step 903, the storage system 700 may make a flash copy of the source volume, as described above in reference to FIG. 7. The flash copying may be a background process to allow a physical copy of the source volume to be made. The storage system 700 may allocate data extents for the target volume from a pool of compressed extents, to hold the compressed data, per step 904. It may also update a volume structure, at step 905, to indicate the compressed extents that have been allocated to the target volume 703 in the current archival operation.

At step 906, the storage system 700 may compress each track of data in the flash copy 702 of the source volume to a set of compressed data pages, and store the compressed data pages in the target volume (step 907). The compression may continue, as shown by the loop back from block 908 to block 906, until a stride worth of data has been compressed before the system destages the data to avoid destage penalties. After the storage system 700 has compressed a stride worth of data from the flash copy, it may destage this compressed stride of data from the system's memory, per step 909. During the compression process, the storage system 700 may allocate additional extents from the compressed extent pool as needed to accommodate all of the compressed data from the flash copy. Once all data in the flash copy has been compressed, and destaged from the storage system's memory, the storage system 700 may deallocate the uncompressed data extents associated with the source volume, per step 910, and return these extents to the uncompressed data extent pool.

Figure 10:
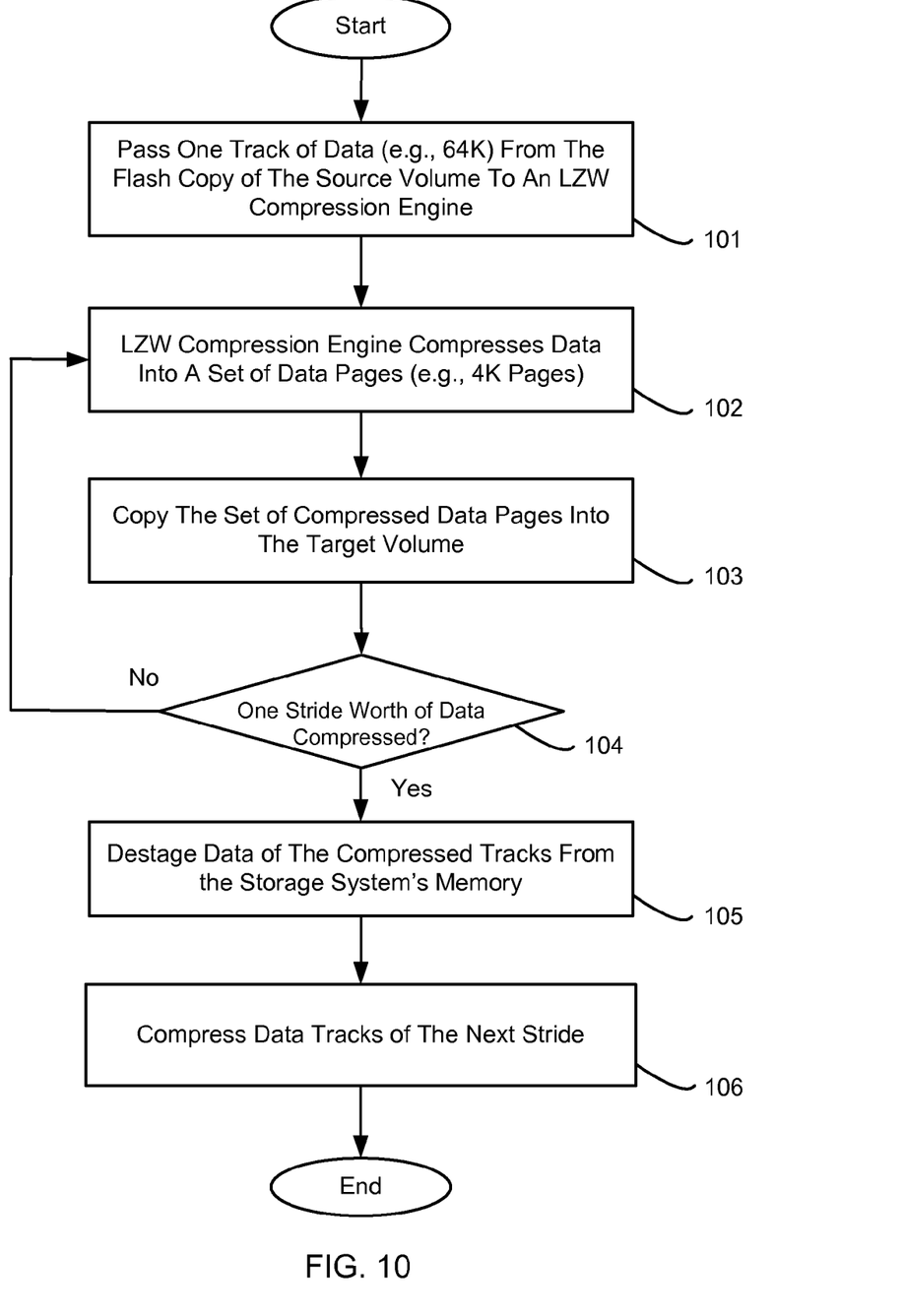
FIG. 10 is a flow chart of an exemplary process for compressing data from a flash copy of the source data volume, according to an embodiment of the disclosure.

FIG. 10 illustrates a flow chart of a process for compressing data from a flash copy of the source volume, per step 906 in FIG. 9, according to an exemplary embodiment of the disclosure. The process may start at step 101 when the storage system 700 passes one track of data 805 from the flash copy 804 to a compression engine. As an example, each track of data may be 64 Kbytes in size and the compression engine may be a LZW compression engine. The LZW compression engine may compress each data track into 2 pages where each page contains 4 Kbytes of compressed data, per step 102. The storage system 700 may then copy the compressed data pages into the target volume at step 103. Once a stride worth of source volume data has been compressed and stored in the target volume, as determined at step 104, the storage system 700 destages the compressed for this stride from the system's memory, per step 105. Otherwise, the data compression of the tracks in the stride continues as shown by the loop back to step 102. Once a stride has been destaged, the storage system 700 may compress data tracks of the next stride, per step 106. The data compression process continues until all of the source volume data, as captured by the flash copy, has been compressed and stored into the target volume.

Figure 11:
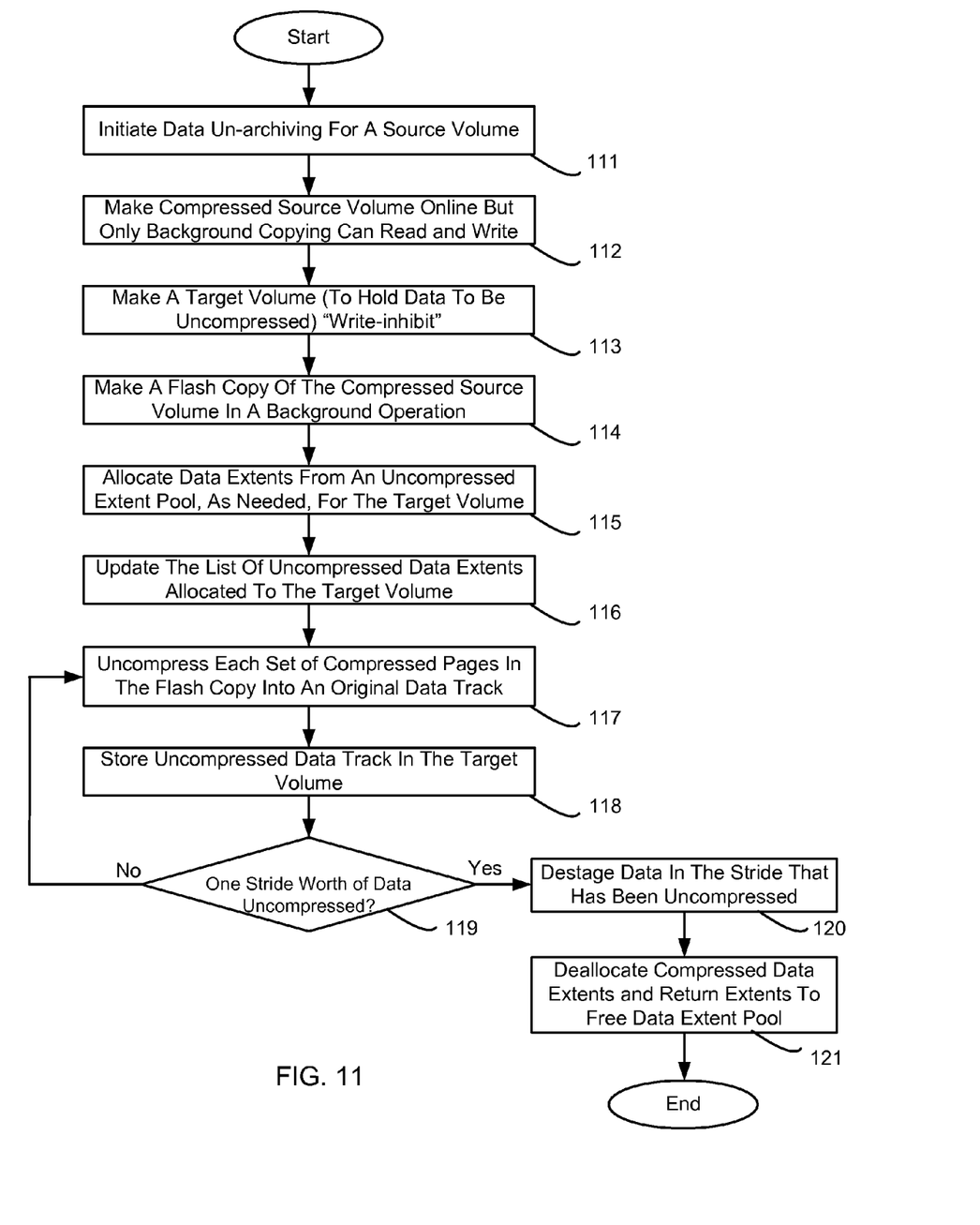
FIG. 11 is a block diagram of a representative computer system that may be used in a computing environment for providing aspects of the disclosure.

FIG. 11 illustrates an exemplary embodiment of a process for restoring archived data from a volume holding the compressed data. The illustrated process may operate as part of a storage management software. In the data restoring process, the volume holding the archived data is referred to as the source volume while the volume holding the restored and uncompressed data is referred to as the target volume. The process may start with an operator or storage management software initiating a command, at step 111, to restore a data volume that has previously archived per the archive process described above with reference to FIGS. 6-10. During the restore operation, the storage system 700 may maintain the source volume holding the compressed data in an online state, but allow only a background copying to read from and write to the volume, as shown by step 112. This allows the background copying to take place, but prevents the hosts from modifying data on the source volume during the unarchiving operation.

The storage system 700 may mark the target volume that will hold the uncompressed data as write-inhibit, at step 113, to suspend all data updates to the target volume during the unarchiving operation. At step 114, the storage system 700 may make a flash copy of the source volume holding the compressed data. The flash copying may be a background process to allow a physical copy of the source volume to be made. The flash copying may involve allocating data extents from an uncompressed extent pool to a target volume that will hold the unarchived data, per step 115, and updating an extent list to indicate the extents allocated to the target volume, per step 116. The storage system 700 may then uncompress, at step 117, each set of pages in the flash copy, which contains compressed data from an original track, back to the original data track. This data uncompression may be performed by an uncompression engine and based on a Lepel-Ziv-Welch (LZW) uncompression technique. The storage system 700 may store the uncompressed data track in the target volume (step 118) and process the next set of compressed data pages from the flash copy.

In order to minimize destage penalties, the storage system 700 may continue to uncompress a full stride worth of data from the source volume, as determined at step 119 and the loop back to step 117, before destaging the uncompressed data in the stride (step 120). Once all sets of compressed data pages in the source volume have been uncompressed and stored in the target volume, the storage system 700 may deallocate the data extents holding the compressed data and return them to the system, per step 121.

Figure 12:
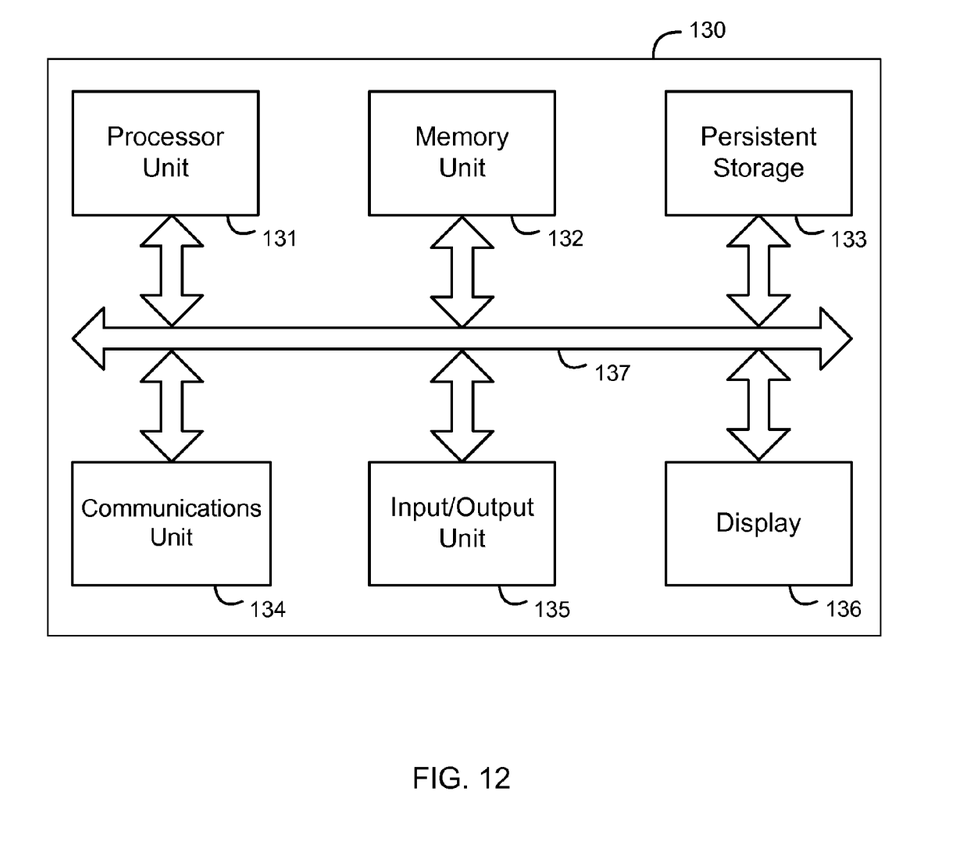
FIG. 12 illustrates a block diagram of a representative computer system that may be used in the computing environment of FIG. 1 for providing aspects of the disclosure.

FIG. 12 illustrates a block diagram of a representative computer system that may be used in the computing environment of FIG. 1 for providing aspects of the disclosure. Data processing system 130 includes a processor unit 131, a memory unit 132, a persistent storage 133, a communications unit 134, an input/output unit 135, a display 136 and a system bus 137. Computer programs are typically stored in persistent storage 133 until they are needed for execution by an operating system (not shown) running in memory unit 132. At that time, the programs are brought into the memory unit 132 so that they can be directly accessed by the processor unit 131. The processor unit 131 selects a part of memory unit 132 to read and/or write by using an address that the processor 131 gives to memory 132 along with a request to read and/or write. Usually, the reading and interpretation of an encoded instruction at an address causes the processor 111 to fetch a subsequent instruction, either at a subsequent address or some other address. The processor unit 131, memory unit 132, persistent storage 133, communications unit 134, input/output unit 135, and display 136 interface with each other through the system bus 137.

As will be appreciated by one skilled in the art, aspects of the present disclosure may be embodied as a method, system or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The subject matter described above is provided by way of illustration only and should not be construed as limiting. Various modifications and substitutions of the described components and operations can be made by those skilled in the art without departing from the spirit and scope of the present disclosure defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer program product for archiving data in a storage system utilizing a RAID-5 configuration, the computer program product comprising a non-transitory computer readable storage medium having computer readable program code embodied therewith, the computer readable program code comprising:
   computer readable program code configured to make a first flash copy of data in a first storage volume while the source volume is off-line, wherein the first flash copy comprises a stride of data including one or more tracks of data and the data includes a previous parity;
   computer readable program code configured to compress the stride of data, wherein the full stride of data is compressed such that each track of data is compressed into a set of compressed data pages;
   computer readable program code configured to destage the compressed full stride of data;
   computer readable program code configured to compute a new parity from the compressed full stride of data without using the data and the previous parity;
   computer readable program code configured to store the set of compressed data pages in a second storage volume; and
   computer readable program code configured to uncompress archived data in the second storage volume including:
      computer readable program code configured to make a second flash copy of data in the second storage volume, wherein the second flash copy includes the sets of compressed data pages and each set of compressed data pages corresponds to a track of uncompressed data pages in the first volume,
      computer readable program code configured to uncompress data in each set of compressed data pages in the second flash copy into the corresponding track of uncompressed data, such that the data being uncompressed is uncompressed as a full stride worth, and
      computer readable program code configured to destage the uncompressed data as the full stride worth and to store the uncompressed data in the first storage volume.

2. The computer program product of claim 1, wherein the computer readable program code comprises:
   computer readable program code configured to mark the second storage volume as write-inhibit;
   computer readable program code configured to allocate for the second storage volume a data extent from a pool of compressed data extents; and
   computer readable program code configured to allocate a new data extent from the compressed data extent pool when there is no more free space in the allocated data extent to store the compressed data.

3. The computer program product of claim 1, further comprising computer code for, prior to uncompressing archived data in the second storage volume, deallocating uncompressed data extents associated with the first storage volume and returning the deallocated uncompressed data extents to an uncompressed data extent pool.

4. The computer program product of claim 3, further comprising computer code for, after uncompressing data in each set of pages in the second flash copy into the corresponding track of uncompressed data, deallocating data extents holding compressed data and returning the data extents to the uncompressed data extent pool.

5. A system for archiving data utilizing a RAID-5 configuration, comprising:
   a first storage volume having data to be archived;
   a logic component configured to make a first flash copy of data in the first storage volume while the first storage volume is off-line, wherein the first flash copy comprises a stride of data including one or more tracks of data and the data includes a previous parity;
   a logic component configured to compress the stride of data, copy wherein the full stride of data is compressed such that each track of data is compressed into a set of compressed data pages;
   a logic component configured to destage the compressed full stride of data;
   a logic component configured to compute a new parity from the compressed full stride of data without using the data and the previous parity;
   a logic component configured to store the set of compressed data pages in a second storage volume while the second storage volume is in a write-inhibit state;
   a logic component configured to uncompress archived data in the second storage volume including:
      a logic component configured to make a second flash copy of data in the second storage volume, wherein the second flash copy includes the sets of compressed data pages and each set of compressed data pages corresponds to a track of uncompressed data pages in the first volume,
      a logic component configured to uncompress data in each set of compressed data pages in the second flash copy into the corresponding track of uncompressed data, such that the data being uncompressed is uncompressed as a full stride worth, and
      a logic component configured to destage the uncompressed data as the full stride worth and to store the uncompressed data in the first storage volume.

6. The system of claim 5, wherein the system is a disk storage system.

7. The system of claim 5, further comprising a logic component configured to, prior to uncompressing archived data in the second storage volume, deallocate uncompressed data extents associated with the first storage volume and return the deallocated uncompressed data extents to an uncompressed data extent pool.

8. The system of claim 7, further comprising a logic component configured to, after uncompressing data in each set of pages in the second flash copy into the corresponding track of uncompressed data, deallocate data extents holding compressed data and return the data extents to the uncompressed data extent pool.

* * * * *